US012479674B2

United States Patent
Haban et al.

(10) Patent No.: US 12,479,674 B2
(45) Date of Patent: Nov. 25, 2025

(54) PALLET SYSTEM FOR CARGO TRANSPORT

(71) Applicant: Aurora Operations, Inc., Pittsburgh, PA (US)

(72) Inventors: Philipp Haban, Pittsburgh, PA (US); Daniel Adam Kanitz, Pittsburgh, PA (US)

(73) Assignee: AURORA OPERATIONS, INC., Pittsburgh, PA (US)

(*) Notice: Subject to any disclaimer, the term of this patent is extended or adjusted under 35 U.S.C. 154(b) by 168 days.

(21) Appl. No.: 18/404,580

(22) Filed: Jan. 4, 2024

(65) Prior Publication Data

US 2024/0150140 A1 May 9, 2024

Related U.S. Application Data

(63) Continuation of application No. 17/712,602, filed on Apr. 4, 2022, now Pat. No. 11,912,517, which is a
(Continued)

(51) Int. Cl.
G06F 7/00 (2006.01)
B65G 43/10 (2006.01)
(Continued)

(52) U.S. Cl.
CPC ............. *B65G 67/04* (2013.01); *B65G 43/10* (2013.01); *G05B 15/02* (2013.01); *G06Q 10/08* (2013.01); *B65G 2201/0267* (2013.01)

(58) Field of Classification Search
CPC ............ B65G 43/10; B65G 2201/0267; B65G 67/02; B65G 67/00–04;
(Continued)

(56) References Cited

U.S. PATENT DOCUMENTS 4,692,876 A 9/1987 Tenma et al.
4,950,118 A 8/1990 Mueller et al.
(Continued)

FOREIGN PATENT DOCUMENTS

CN 102381569 A 3/2012
CN 105488750 A 4/2016
(Continued)

OTHER PUBLICATIONS

International Search Report and Written Opinion for Application No. PCT/US2019/044419, mailed on Oct. 31, 2019, 11 pages.

Primary Examiner — Yolanda R Cumbess
(74) Attorney, Agent, or Firm — Dority & Manning, P.A.

(57) ABSTRACT

In one example embodiment, a computer-implemented method for transporting cargo using smart palettes includes determining receipt of a first cargo onto a platform of a first smart palette at a first distribution hub. The method includes generating one or more signals that control a loading of the first smart palette and the first cargo onto a trailer located at the first distribution hub. The method includes determining a coordination with one or more second smart palettes associated with the trailer to determine a first position inside the trailer for the first smart palette and the first cargo. The method includes generating one or more signals that position the first smart palette and the first cargo at the first position inside the trailer.

20 Claims, 7 Drawing Sheets

Related U.S. Application Data continuation of application No. 16/103,164, filed on Aug. 14, 2018, now Pat. No. 11,292,678.

(60) Provisional application No. 62/712,281, filed on Jul. 31, 2018.

(51) Int. Cl.
*B65G 67/04* (2006.01)
*G05B 15/02* (2006.01)
*G06Q 10/08* (2023.01)

(58) Field of Classification Search
CPC .... B65G 67/18–24; B65G 1/00; B65G 43/00; G05B 15/02; G05B 19/0423; G05B 15/00; G06Q 10/08; G06Q 10/043; G06Q 10/047; G06Q 10/08355; G06Q 10/00; G06Q 10/0835; G06Q 10/04; G06Q 10/083; G06Q 10/08365; G06Q 10/0837; G06Q 10/0843; G06Q 10/087; G06Q 10/08743; G06Q 10/08744; G05D 1/6987; G05D 2105/28; G05D 2107/95; G05D 2109/10; G05D 1/00; G05D 2105/20; G05D 2107/00; G05D 2109/20; G05D 2109/50; G05D 2111/00
USPC .................................. 700/214–215; 701/200
See application file for complete search history.

(56) References Cited

U.S. PATENT DOCUMENTS

| | | |
|---|---|---|
| 6,357,985 B1 | 3/2002 | Anzani et al. |
| 7,991,505 B2 | 8/2011 | Lert, Jr. et al. |
| 8,972,045 B1 | 3/2015 | Mountz et al. |
| 9,505,595 B1 | 11/2016 | Smith et al. |
| 9,776,717 B2 | 10/2017 | Spinelli |
| 9,827,683 B1 | 11/2017 | Hance |
| 9,864,968 B2 | 1/2018 | Moir et al. |
| 10,310,499 B1 * | 6/2019 | Brady ................. G05D 1/0291 |
| 10,890,921 B2 | 1/2021 | Gillett |
| 11,104,547 B2 | 8/2021 | Dayrell |
| 2008/0167817 A1 | 7/2008 | Hessler et al. |
| 2010/0110185 A1 | 5/2010 | Tafazoli Bilandi |
| 2012/0134771 A1 | 5/2012 | Larson et al. |
| 2015/0073589 A1 | 3/2015 | Kbodl et al. |
| 2017/0123421 A1 | 5/2017 | Kentley et al. |
| 2017/0183159 A1 | 6/2017 | Weiss |
| 2017/0212526 A1 | 7/2017 | Vanderpool et al. |
| 2018/0029797 A1 | 2/2018 | Hance et al. |
| 2018/0202822 A1 | 7/2018 | DeLizio |
| 2019/0161190 A1 * | 5/2019 | Gil .......................... H04L 67/55 |
| 2019/0168392 A1 | 6/2019 | Vain et al. |
| 2019/0329691 A1 * | 10/2019 | Crawford ............. G05D 1/0088 |
| 2021/0347569 A1 | 11/2021 | Dayrell |

FOREIGN PATENT DOCUMENTS

| | | |
|---|---|---|
| JP | 2000343470 A | 12/2000 |
| JP | 2018045633 A | 3/2018 |

* cited by examiner

PALLET SYSTEM FOR CARGO TRANSPORT

PRIORITY CLAIM

The present application is a continuation of U.S. application Ser. No. 17/712,602 having a filing date of Apr. 4, 2022, which is a continuation of U.S. application Ser. No. 16/103,164 having a filing date of Aug. 14, 2018 (now issued as U.S. Pat. No. 11,292,678 on Apr. 5, 2022). U.S. application Ser. No. 16/103,164 claims the benefit of priority of U.S. Provisional Patent Application 62/712,281 filed Jul. 31, 2018, entitled "Palette System for Cargo Transport." Applicant claims priority to and the benefit of each of such applications and incorporates all such applications herein by reference in its entirety.

FIELD

The present disclosure relates generally to a smart palette system for transporting cargo, and more particularly to systems and methods for transporting cargo using smart palettes.

BACKGROUND

A palette is a flat transport structure which can support cargo in a stable fashion while moved from one location to another (e.g., with a forklift, pallet jack, came, or other vehicle). The palette is a dumb structure that must be manually positioned or repositioned (e.g., inside a distribution warehouse, transport vehicle, etc.). It would be advantageous for a palette to be able to move itself rather than rely on external means. It would be further advantageous for a palette to immediately respond to events in a dynamic environment. For example, if a palette is in the way of a person or object, then it would be advantageous for the palette to automatically move out of the way.

SUMMARY

Aspects and advantages of the present disclosure will be set forth in part in the following description, or may be learned from the description, or may be learned through practice of the embodiments.

One example aspect of the present disclosure is directed to a computer-implemented method for transporting cargo using smart palettes. The method includes determining receipt of a first cargo onto a platform of a first smart palette at a first distribution hub. The method includes generating one or more signals that control a loading of the first smart palette and the first cargo onto a trailer located at the first distribution hub. The method includes determining a coordination with one or more second smart palettes associated with the trailer to determine a first position inside the trailer for the first smart palette and the first cargo. The method includes generating one or more signals that position the first smart palette and the first cargo at the first position inside the trailer.

Another example aspect of the present disclosure is directed to a system for transporting cargo using smart palettes. The system includes a plurality of smart palettes, one or more processors, and one or more tangible, non-transitory, computer readable media that collectively store instructions that when executed by the one or more processors cause the system to perform operations. The operations include determining a first cargo at a first location within a first distribution hub to be transported to a second distribution hub. The operations include selecting a first smart palette associated with the first distribution hub from the plurality of smart palettes, to move the first cargo from the first location to a trailer at the first distribution hub. The operations include providing data indicative of the trailer at the first distribution hub, and data indicative of one or more second smart palettes associated with the trailer to the first smart palette, wherein in response to receiving the data the first smart palette coordinates with the one or more second smart palettes to position the first smart palette and the first cargo inside the trailer.

Yet another example aspect of the present disclosure is directed to a smart palette. The smart palette includes a support structure that receives cargo, a drive mechanism that rotationally drives one or more ground engaging components of the smart palette to move the smart palette from a first location to a second location, one or more processors, and one or more tangible, non-transitory, computer readable media that collectively store instructions that when executed by the one or more processors cause the smart palette to perform operations. The operations include determining receipt of a first cargo onto a platform of the support structure at a first distribution hub. The operations include obtaining data indicative of a trailer at the first distribution hub to transport the first cargo, and data indicative of one or more second smart palettes associated with the trailer. The operations include controlling the drive mechanism to load the first cargo onto the trailer at the first distribution hub. The operations include coordinating with the one or more second smart palettes associated with the trailer to determine a first position inside the trailer for the first cargo. The operations include controlling the drive mechanism to position the first cargo and the support structure at the first position inside the trailer.

Other example aspects of the present disclosure are directed to systems, methods, vehicles, smart palettes, apparatuses, tangible, non-transitory computer-readable media, and memory devices for controlling or managing operations of smart palettes when providing a vehicle-based service.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

Figure 1:
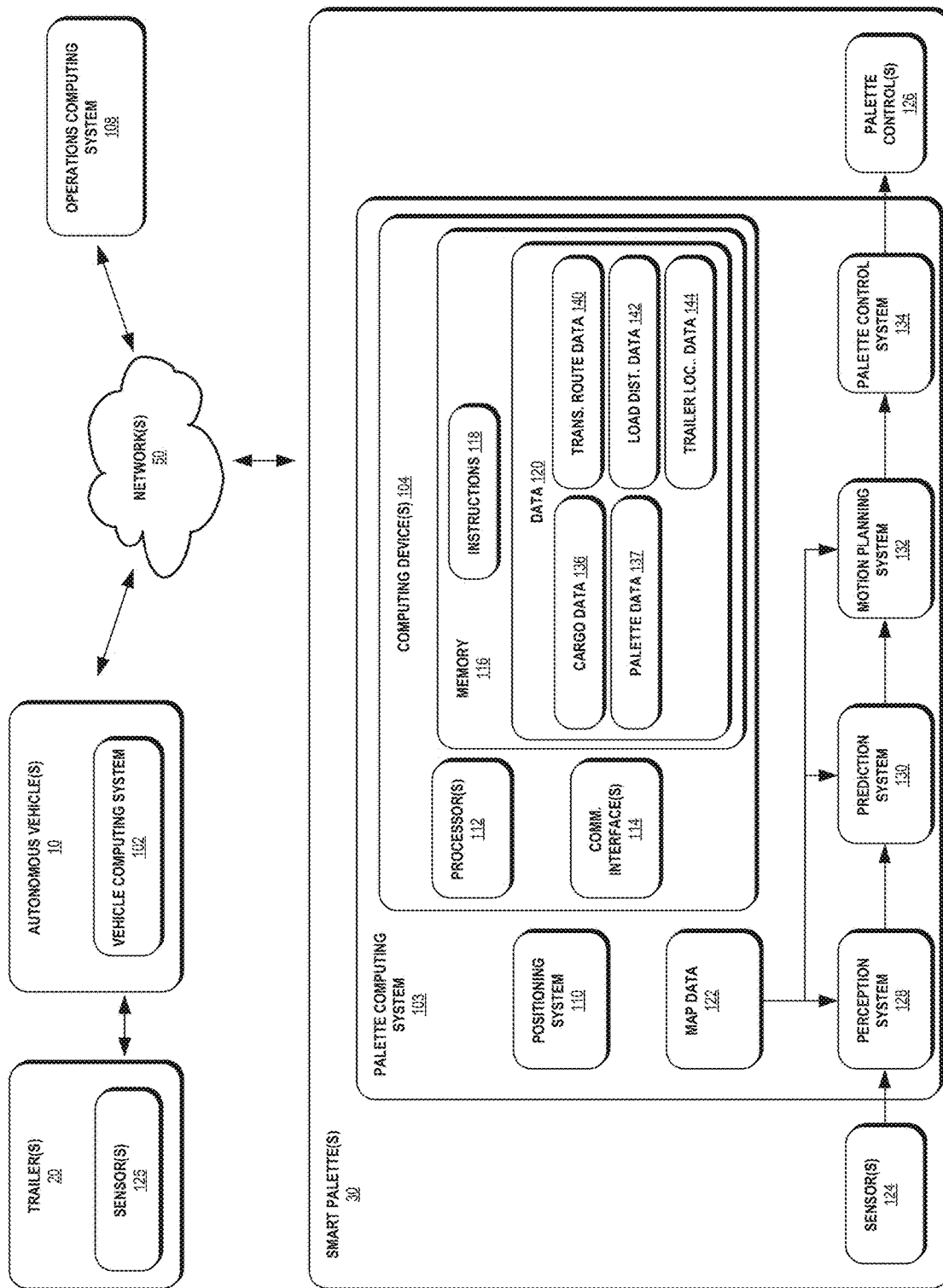
FIG. 1 depicts an example computing environment 100 according to example embodiments of the present disclosure.

Reference numerals that are repeated across plural figures are intended to identify the same components or features in various implementations.

DETAILED DESCRIPTION

Example aspects of the present disclosure are directed to smart palettes for transporting cargo. In particular, the smart palettes can be used to transport cargo from a first location to a second location as part of a vehicle-based service (e.g., transportation service, courier service, delivery service, freight service, etc.). For instance, an entity (e.g., service provider) can coordinate, direct, or operate a fleet of vehicles to provide a freight transport service. The fleet can include, for example, autonomous vehicles that can drive, navigate, operate, etc. with minimal and/or no interaction from a human driver. The service provider can operate a vehicle in the fleet (e.g., an autonomous vehicle or a non-autonomous vehicle) to transport cargo from the first location (e.g., first distribution hub) to the second location (e.g., second distribution hub). For example, the vehicle can include a cargo enclosure, container, bed, or other structure that can hold cargo (e.g., straight truck), or the vehicle can be attached (e.g., hitched) to a cargo enclosure, container, bed, trailer, or other structure that can hold cargo. Hereinafter the term "trailer" is used to refer to any of the aforementioned structures. The vehicle can transport the trailer that contains cargo from the first distribution hub to the second distribution hub. When the trailer is at the first distribution hub, the service provider can operate one or more smart palettes to autonomously load cargo located at the first distribution hub onto the trailer. The service provider can operate the vehicle to transport the trailer from the first distribution hub to the second distribution hub where one or more smart palettes can unload cargo from the trailer. In this way, the smart palette(s) can be used to transport the cargo from the first distribution hub to the second distribution hub.

More particularly, a service provider network can operate a fleet of one or more vehicles (e.g., ground-based vehicles) to provide a vehicle-based service, such as a transportation service, courier service, delivery service, or freight service. The vehicles can be autonomous vehicles that include various systems and devices configured to control the operation of the vehicle. For example, an autonomous vehicle can include an onboard vehicle computing system for operating the vehicle (e.g., located on or within the autonomous vehicle). In some implementations, the autonomous vehicles can operate in an autonomous mode. For example, the vehicle computing system can receive sensor data from sensors onboard the vehicle (e.g., cameras, LIDAR, RADAR), attempt to comprehend the environment proximate to the vehicle by performing various processing techniques on the sensor data, and generate an appropriate motion plan through the environment. In some implementations, the autonomous vehicles can operate in a manual mode. For example, a human operator (e.g., a driver) can manually control the autonomous vehicle. Moreover, the autonomous vehicle can be configured to communicate with one or more computing device(s) that are remote from the vehicle. As an example, the autonomous vehicle can communicate with an operations computing system that can be associated with the service provider network. The operations computing system can help the service provider network monitor, communicate with, manage, etc. the fleet of vehicles. As another example, the autonomous vehicle can communicate with one or more other vehicles (e.g., a vehicle computing system onboard each of the one or more other vehicles in the fleet), one or more smart palettes (e.g., a palette computing system onboard each of the one or more smart palettes), one or more other computing systems associated with the service provider network, and/or any other suitable remote computing system(s). In some implementations, the operations computing system can mediate communication between the autonomous vehicle and the computing device(s) that are remote from the vehicle.

According to aspects of the present disclosure, the service provider network can operate a plurality of smart palettes to transport cargo, as part of a vehicle-based service. The smart palette(s) can include various systems and devices configured to control the operation of the smart palette. For example, a smart palette can include an onboard palette computing system for operating the smart palette (e.g., located on or within the smart palette). The palette computing system can operate the smart palette to autonomously load or unload cargo onto a trailer, and to position or reposition the smart palette inside the trailer. The palette computing system can coordinate with one or more other smart palettes (e.g., a palette computing system onboard each of the one or more other smart palettes) associated with the trailer to determine the smart palette's position inside the trailer. The one or more other smart palettes associated with the trailer can include one or more smart palettes that have been previously positioned (e.g., pre-positioned) inside the trailer when the palette computing system operates the smart palette to autonomously load cargo and/or position the smart palette. In addition, or as an alternative thereto, the one or more other smart palettes associated with the trailer can include one or more smart palettes that will be positioned (e.g., post-positioned) inside the trailer after the palette computing system operates the smart palette to autonomously load cargo and/or position the smart palette.

In some implementations, the smart palette can include a motor or other drive means configured to rotationally drive one or more ground engaging components, such as wheels or tracks. The palette computing system can control the motor to move the smart palette from a first location to a second location. For example, the palette computing system can control the motor to move the smart palette to a cargo pick-up location (e.g., a location of cargo at a distribution hub) to pick-up cargo, move the smart palette from a cargo pick-up location to a trailer location (e.g., a location of a trailer at a distribution hub), move the smart palette onto a trailer, move the smart palette off a trailer, and move the smart palette from a trailer location to a cargo drop-off location (e.g., a location at a distribution hub) to drop-off cargo.

In some implementations, the smart palette can include a platform that can receive and hold cargo. For example, the operations computing system can determine that a first cargo located at a first distribution hub is to be transported to a second distribution hub. The operations computing system can instruct the smart palette to move to a cargo pick-up location of the first cargo at the first distribution hub and cause the first cargo to be placed on the platform of the smart palette. The palette computing system can control the motor of the smart palette to move the smart palette to the cargo pick-up location where the smart palette can receive and hold the first cargo on the platform. The palette computing system can determine receipt of the first cargo onto the platform and control the motor of the smart palette to move the smart palette with the first cargo from the cargo pick-up location to a trailer location of a trailer at the first distribution hub.

In some implementations, the smart palette can include one or more sensors (e.g., cameras, LIDAR, RADAR, compass, accelerometer, gyroscope etc.). The palette computing system can obtain sensor data from the sensor(s), attempt to comprehend the environment proximate to the smart palette by performing various processing techniques on the sensor data, and generate an appropriate action based on the sensor data.

As an example, the palette computing system can obtain sensor data indicative of an environment within a distribution hub and generate a motion plan from a first location to a second location at the distribution hub (e.g., from a cargo pick-up location to a trailer location, or from a trailer location to a cargo drop-off location).

As another example, the palette computing system can obtain sensor data indicative of an environment inside a trailer to determine a position for positioning the smart palette inside the trailer.

As another example, the palette computing system can obtain sensor data indicative of a weight distribution of cargo on the platform of the smart palette. The palette computing system can use the weight distribution data to determine whether the cargo's weight is within acceptable limits of the smart palette (e.g., below a maximum weight that the smart palette is capable of moving).

As another example, the palette computing system can obtain sensor data indicative of a weight distribution of cargo on the platform of the smart palette at two or more times. The palette computing system can also compare the weight distribution data at a first and second time to determine a change in weight distribution. The palette computing system can determine, based on the change in weight distribution, if the cargo is shifting or sliding on the platform when the smart palette is in motion (e.g., when the smart palette is moving from a first location to a second location, when the smart palette is inside a moving trailer that is being transported from a first distribution hub to a second distribution hub, etc.). The palette computing system can control the smart palette to adjust for the change in weight distribution in order to keep the cargo's center of mass within the boundaries of the platform.

As another example, the palette computing system can obtain sensor data indicative of an orientation of the smart palette. The palette computing system can use the orientation data to determine if the smart palette is not level (e.g., when the smart palette is on an inclined surface, when the smart palette is inside a trailer on an inclined surface, etc.). If the palette computing system determines that the smart palette is holding cargo when the smart palette is not level, then the palette computing system can control the smart palette to adjust the orientation of the platform in order to prevent the cargo from shifting, sliding, or falling off the platform.

In some implementations, the smart palette can include a communications interface to communicate with one or more other computing systems. The palette computing system can use the communications interface to communicate with the operations computing system, one or more other smart palette computing systems, or a vehicle computing system, in order to transport cargo (e.g., from a first distribution hub to a second distribution hub).

As an example, the palette computing system can communicate with the operations computing system to obtain data indicative of a first cargo to be transported. The cargo data can include a cargo pick-up location at a first distribution hub, a destination distribution hub for the first cargo, a cargo drop-off location at the destination distribution hub, a trailer location of a trailer at the first distribution hub, and a vehicle (e.g., autonomous vehicle) assigned to transport the trailer (e.g., from the first distribution hub to the destination distribution hub). The palette computing system can control the smart palette to move to the cargo pick-up location at the first distribution hub to receive the first cargo, and control the smart palette to move to the trailer location and load the first cargo (e.g., load the smart palette with the first cargo) onto the trailer. The palette computing system can communicate with a vehicle computing system of the vehicle assigned to transport the trailer to obtain data indicative of the trailer location after departing the first distribution hub (e.g., a location of the trailer during transit). The palette computing system can use the trailer location data to determine if the trailer has arrived at the destination distribution hub (or the second distribution hub). If the palette computing system determines that the trailer has arrived at the destination distribution hub, then the palette computing system can control the smart palette to unload the first cargo from the trailer (e.g., unload the smart palette with the first cargo), and control the smart palette to move to the cargo drop-off location at the destination distribution hub.

As another example, the palette computing system can communicate with the operations computing system to obtain data indicative of a first cargo to be transported and a cargo route for the first cargo. The cargo route can include a first distribution hub associated with a cargo pick-up location, a destination distribution hub associated with a cargo drop-off location, and one or more transfer distribution hubs. Each distribution hub in the cargo route can be associated with a trailer location of a trailer, and a vehicle assigned to transport the trailer. The palette computing system can control the smart palette to receive and load the first cargo onto a first trailer that is located at the first distribution hub. If the palette computing system determines that the trailer has arrived at a transfer distribution hub from the one or more transfer distribution hubs, then the palette computing system can control the smart palette to unload the first cargo from the first trailer, and load the first cargo onto a second trailer that is located at the transfer distribution hub.

As another example, the palette computing system can communicate with one or more other palette computing systems to position the smart palette inside a trailer. The palette computing system can determine a trailer to load a first cargo (e.g., based on cargo data obtained from the operations computing system) and determine one or more other smart palettes that are associated with the trailer. The one or more other smart palettes can each be associated with respective cargo to be transported inside the trailer, or that will be transported inside the trailer. The palette computing system can coordinate with the one or more other palette computing systems to position the smart palette with the first cargo inside the trailer, for example, based on a transportation route of an autonomous vehicle assigned to transport the trailer (e.g., so that smart palettes with cargo that will unload sooner are positioned nearer to an exit of the trailer), a load distribution of the smart palette and the one or more other smart palettes inside the trailer (e.g., to distribute the load evenly inside the trailer), and/or one or more dimensions associated with the first cargo (e.g., to minimize unused space inside the trailer). In some implementations, the palette computing system can identify one or more pre-positioned smart palettes from the one or more other smart palettes, and the palette computing system can coordinate with the pre-positioned smart palette(s) to determine a position for the smart palette with the first cargo. In some implementations, after the palette computing system positions the smart palette with the first cargo inside the trailer, the palette computing system can identify one or more post-positioned smart palettes from the one or more other smart palette(s), and the palette computing system can coordinate with the post-positioned smart palette(s) to reposition the smart palette with the first cargo inside the trailer (e.g., based on a position of the post-positioned smart palette(s) inside the trailer).

In some implementations, the palette computing system can communicate with a vehicle computing system of an autonomous vehicle assigned to transport a trailer including the smart palette with the first cargo to obtain data indicative of a change in a transportation route of the autonomous vehicle. The palette computing system can use the transportation route change data to reposition the smart palette inside the trailer (e.g., by coordinating with one or more other smart palettes inside the trailer).

As an example, the autonomous vehicle can be associated with a transportation route indicating that the autonomous vehicle will transport the trailer from a first distribution hub to a second distribution hub, and the palette computing system can load the smart palette onto the trailer at the first distribution hub based on this transportation route. If the transportation route is changed while the autonomous vehicle is in transit to the second distribution hub such that the autonomous vehicle will instead transport the trailer to a third distribution hub (e.g., the autonomous vehicle is rerouted due to traffic conditions, maintenance issues, or logistics), then the palette computing system can communicate with a vehicle computing system of the autonomous vehicle to obtain data indicative of the change in the transportation route. The palette computing system can coordinate with one or more other smart palette(s) inside the trailer to determine a new position for the smart palette based on the transportation route change data. The palette computing system can control the smart palette to reposition the smart palette at the new position while the autonomous vehicle is transporting the trailer. Likewise, a palette computing system associated with each of the one or more other smart palette(s) inside the trailer can determine a new position for a corresponding smart palette, based on the transportation route change data, and reposition the corresponding smart palette. In this way, when the trailer arrives at the third distribution hub, cargo to be unloaded at the third distribution hub is positioned nearer to an exit of the trailer and the cargo can be unloaded quickly and efficiently.

As another example, the palette computing system can communicate with a vehicle computing system of an autonomous vehicle that is transporting the smart palette and a first cargo on a platform of the smart palette (e.g., inside a trailer hitched to the autonomous vehicle), to obtain data indicative of a change in load distribution. The palette computing system or the vehicle computing system can obtain the data indicative of the change in load distribution from one or more sensors associated with the smart palette and/or the trailer. The palette computing system can use the data to reposition the smart palette inside the trailer. If the autonomous vehicle experiences a tire blowout of a tire near the front of the trailer, then the vehicle computing system onboard the autonomous vehicle can determine to shift the load distribution inside the trailer towards the rear of the trailer. The palette computing system can obtain data indicative of the change in load distribution and coordinate with one or more other smart palettes inside the trailer to determine a new position for the smart palette based on the change in the load distribution. The palette computing system can control the smart palette to position the smart palette at the new position. Likewise, each of the one or more other palette computing systems can determine a respective new position for a corresponding smart palette based on the change in the load distribution, and position the corresponding smart palette at the new position.

The systems and methods described herein may provide a number of technical effects and benefits. For instance, by enabling a smart palette that can communicate with a vehicle computing system of an autonomous vehicle, and loading the smart palette onto a trailer of the autonomous vehicle together with cargo, the smart palette can autonomously determine when the cargo has arrived at a destination and autonomously unload the cargo at the destination. Additionally, by enabling a palette computing system onboard the smart palette to communicate with one or more other palette computing systems associated with the trailer, the palette computing system can autonomously position the smart palette inside the trailer to optimize loading and unloading cargo, load distribution inside the trailer, and utilization of available space inside the trailer. Furthermore, the present disclosure enables the palette computing system to reposition the smart palette inside the trailer while the trailer is in transit based on a change in destination of the autonomous vehicle and/or a change in load distribution associated with the trailer. In this way, the present disclosure enables the transportation of cargo from one location to another with improved speed and efficiency.

The systems and methods described herein may also provide resulting improvements to computing technology tasked with transporting cargo. For example, the systems and methods described herein may provide improvements in a utilization of the fleet of vehicles for providing a vehicle-based service by reducing a time spent at one or more distribution hubs for loading and unloading cargo, resulting in increased throughput and improved efficiency.

With reference now to the FIGS., example embodiments of the present disclosure will be discussed in further detail.

FIG. 1 depicts an example computing environment 100 according to example embodiments of the present disclosure. The example environment 100 illustrated in FIG. 1 is provided as an example only. The components, systems, connections, and/or other aspects illustrated in FIG. 1 are optional and are provided as examples of what is possible, but not required, to implement the present disclosure. The example environment 100 can include one or more autonomous vehicles 10, one or more trailers 20, one or more smart palettes 30, and an operations computing system 108. Vehicle(s) 10 can each be associated with a vehicle computing system 102. Smart palette(s) 30 can each be associated with a palette computing system 103. Vehicle computing system 102, palette computing system 103, and operations computing system 108 can be remote from each other and communicatively coupled to one another over one or more networks 40.

In some implementations, vehicle(s) 10 incorporating the vehicle computing system 102 can be part of a fleet of vehicles managed by the operations computing system 108. The operations computing system 108 can manage vehicle(s) 10 via the vehicle computing system 102. Vehicle (s) 10 can be a ground-based autonomous vehicle (e.g., car, truck, bus), an air-based autonomous vehicle (e.g., airplane, drone, helicopter, or other aircraft), or other types of vehicles (e.g., boat, ship, or other watercraft). Vehicle(s) 10 can be an autonomous vehicle that can drive, navigate, operate, etc. with minimal and/or no interaction from a human driver, or vehicle(s) 10 can be manually controlled by a human operator.

In some implementations, the operations computing system 108 can assign vehicle(s) 10 to transport the trailer(s) 20. Trailer(s) 20 can include one or more sensors 125 that can acquire sensor data indicative of cargo that is loaded onto trailer(s) 20. For example, the sensor data can include data indicative of a total weight of the cargo inside trailer(s) 20, and a distribution of the weight (e.g., load distribution) inside trailer(s) 20. When operations computing system 108 assigns vehicle(s) 10 to transport the trailer(s) 20, vehicle computing system 102 can control the vehicle(s) 10 to hitch trailer(s) 20 and communicate with the sensor(s) 125 to obtain the sensor data. Alternatively, in some implementations, trailer(s) 20 can each be associated with a trailer computing system that is communicatively coupled to one or more remote computing systems (e.g., vehicle computing system 102, palette computing system 103, operations computing system 108, etc.) over network(s) 40. The trailer computing system can obtain sensor data that is acquired by the sensor(s) 125 and provide the sensor data to the one or more remote computing systems.

In some implementations, smart palette(s) 30 incorporating the palette computing system 103 can be operated by operations computing system 108. Operations computing system 108 can operate smart palette(s) 30 via palette computing system 103. Operations computing system 108 can assign smart palette(s) 30 to transport cargo from a first distribution hub to a second distribution hub. Smart palette(s) 30 can include a platform for receiving cargo, and palette control(s) 126 (e.g., a motor or other drive means configured to rotationally drive one or more ground engaging components, such as wheels or tracks).

Smart palette(s) 30 can be capable of sensing its environment, navigating its environment with minimal or no human input, and/or the like. Smart palette(s) 30 can include one or more sensors 124, palette computing system 103, and one or more palette controls 126. Computing system 103 can assist in controlling smart palette(s) 30. For example, computing system 103 can receive data generated by sensor(s) 124, attempt to comprehend an environment surrounding smart palette(s) 30 by performing various processing techniques on the data generated by sensor(s) 124, generate, determine, select, and/or the like a motion plan for navigating smart palette(s) 30 through, within, and/or the like such surrounding environment, and/or the like. Computing system 103 can interface with palette control(s) 126 to operate smart palette(s) 30 (e.g., in accordance with the motion plan, and/or the like).

Computing system 103 can include one or more computing devices 104. Computing device(s) 104 can include circuitry configured to perform one or more operations, functions, and/or the like described herein. For example, computing device(s) 104 can include one or more processor (s) 112, one or more communication interfaces 114, and memory 116 (e.g., one or more hardware components for storing executable instructions, data, and/or the like). Communication interface(s) 114 can enable computing device(s) 104 to communicate with one another, and/or can enable smart palette(s) 30 (e.g., computing system 103, computing device(s) 104, and/or the like) to communicate with one or more computing systems, computing devices, and/or the like distinct from smart palette(s) 30 (e.g., vehicle computing system 102, operations computing system 108, and/or the like). Memory 116 can include (e.g., store, and/or the like) instructions 118 and data 120. When executed by processor(s) 112, instructions 118 can cause smart palette(s) 30 (e.g., computing system 103, computing device(s) 104, and/or the like) to perform one or more operations, functions, and/or the like described herein. Data 120 can include, represent, and/or the like information associated with such operations, functions, and/or the like, data generated by sensor(s) 124, cargo data 124, palette data 137, transportation route data 140, load distribution data 142, trailer location data 144, and/or the like.

Cargo data 124 can include a first distribution hub corresponding to cargo associated with smart palette(s) 30, a cargo pick-up location at the first distribution hub associated with the cargo, a destination distribution hub corresponding to cargo associated with smart palette(s) 30, and a cargo drop-off location at the destination distribution hub associated with the cargo. In some implementations, cargo data 124 can include a cargo route for the cargo. The cargo route can include the first distribution hub, the destination distribution hub, and one or more transfer distribution hubs corresponding to cargo associated with smart palette(s) 30. Each distribution hub in the cargo route can be associated with a trailer location of a trailer that is associated with smart palette(s) 30 at the distribution hub, and a vehicle 10 assigned to transport the trailer from the distribution hub to another location.

Palette data 137 can include data indicative of one or more palette computing systems 103 onboard one or more smart palettes 30 that are associated with the same trailer (e.g., that are transported in the same trailer), a destination distribution hub corresponding to cargo associated with the one or more smart palettes 30, one or more cargo dimensions corresponding to cargo associated with the one or more smart palettes 30, and a palette size associated with the one or more smart palettes 30.

Transportation route data 140 can include a transportation route associated with vehicle(s) 10 that is transporting smart palette(s) 30 (e.g., that is transporting smart palette(s) inside trailer 20 that is hitched to vehicle(s) 10).

Load distribution data 142 can include a distribution of weight associated with smart palette(s) 30 inside the same trailer. In some implementations, load distribution data 142 can include an optimal distribution of weight inside the trailer.

Trailer location data 144 can include a location of a trailer associated with smart palette(s) 30 at a distribution hub where smart palette(s) 30 is currently located, and/or a location of a trailer associated with smart palette(s) 30 during transit from a first location (e.g., first distribution hub) to a second location (e.g., second distribution hub).

Computing system 103 can be physically located onboard smart palette(s) 30, and computing systems 102, 108 can be distinct and/or remotely located from smart palette(s) 30. Network(s) 40 (e.g., wired networks, wireless networks, and/or the like) can interface smart palette(s) 30 (e.g., computing system 103, computing device(s) 104, and/or the like) with computing systems 102, 108, which can include one or more computing devices analogous to computing device(s) 104, one or more components (e.g., memory, processors, communication interfaces, and/or the like)

analogous to those of computing device(s) 104, and/or the like. Irrespective of attribution described or implied herein, unless explicitly indicated otherwise, the operations, functions, and/or the like described herein can be performed by computing system(s) 103 and/or 108 (e.g., by computing system 103, by computing system 108, by a combination of computing systems 103 and 108, and/or the like).

Computing system 103 can include positioning system 110, which can include one or more devices, circuitry, and/or the like for analyzing, approximating, determining, and/or the like one or more geographic positions of smart palette(s) 30. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 103 can include perception system 128, prediction system 130, and motion-planning system 132, which can cooperate to perceive a dynamic environment surrounding smart palette(s) 30, generate, determine, select, and/or the like a motion plan for smart palette(s) 30, and/or the like.

Perception system 128 can receive data from sensor(s) 124, which can be coupled to or otherwise included within smart palette(s) 30. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding smart palette(s) 30. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding smart palette(s) 30. For example, map data 122 can provide information regarding: the identity and location of different travel ways (e.g., to travel within a distribution hub, and/or the like), buildings, other static items or objects (e.g., cargo, and/or the like); the location and directions of travel lanes (e.g., for a plurality of smart palettes within a distribution hub, and/or the like); traffic-control data (e.g., the location and/or instructions of signage, traffic lights, other traffic-control devices, and/or the like); other map data providing information that can assist computing system 103 in comprehending, perceiving, and/or the like an environment surrounding smart palette(s) 30, its relationship thereto, and/or the like.

Perception system 128 can (e.g., based at least in part on data received from sensor(s) 124, map data 122, and/or the like) identify one or more objects proximate to smart palette(s) 30 and determine, for each of such object(s), state data describing a current state of the object, for example, an estimate of the object's: size/footprint (e.g., as represented by a bounding shape such as a polygon, polyhedron, and/or the like); class (e.g., vehicle, smart palette, pedestrian, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for smart palette(s) 30, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for smart palette(s) 30 that it determines (e.g., based at least in part on one or more operation parameters, and/or the like) best navigates smart palette(s) 30 relative to the object(s). Motion-planning system 132 can provide the motion plan to palette control system 134, which can directly and/or indirectly control smart palette(s) 30 via palette control(s) 126 (e.g., one or more actuators, devices, and/or the like that control gas, power flow, steering, braking, and/or the like) in accordance with the motion plan.

Perception system 128, prediction system 130, motion-planning system 132, and/or palette control system 134 can include logic utilized to provide functionality described herein. Perception system 128, prediction system 130, motion-planning system 132, and/or palette control system 134 can be implemented in hardware (e.g., circuitry, and/or the like), firmware, software configured to control one or more processors, one or more combinations thereof, and/or the like. For example, instructions 118, when executed by processor(s) 112, can cause smart palette(s) 30 (e.g., computing system 103, computing device(s) 104, and/or the like) to implement functionality of perception system 128, prediction system 130, motion-planning system 132, and/or vehicle-control system 134 described herein.

Figure 2B:
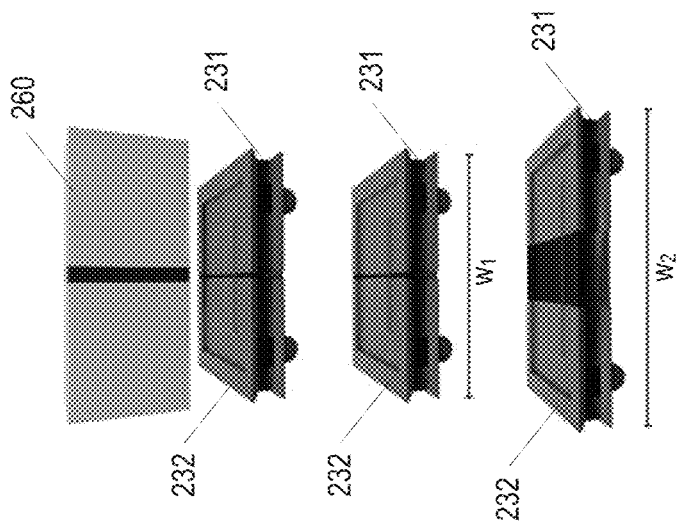
FIG. 2B depicts an example of adjusting a platform size of a smart palette according to example embodiments of the present disclosure.
Figure 2A:
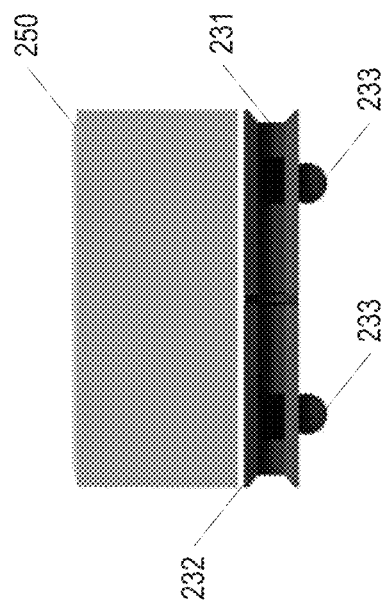
FIG. 2A depicts an example smart palette according to example embodiments of the present disclosure.

FIG. 2A depicts an example smart palette according to example embodiments of the present disclosure. As shown in FIG. 2A, smart palette 231 can include platform 232 and one or more ground engaging components 233 (e.g., wheels, tracks, etc.). Smart palette 231 can include an onboard palette computing system 103 and sensor(s) 124 (not shown). Smart palette 231 can receive cargo 250 on platform 232, and can move from one location to another location using the ground engaging component(s) 233. For example, operations computing system 108 can instruct computing system 103 of smart palette 231 to pick-up cargo 250. Operations computing system 108 can provide cargo data 136 indicative of a cargo pick-up location of cargo 250 at a distribution hub, and trailer location data 144 indicative of a location of a trailer at the distribution hub, to computing system 103. In response, computing system 103 can control ground engaging component(s) 233 to move smart palette 231 to the cargo pick-up location, where smart palette 231 can receive and hold cargo 250 on platform 232, and to move smart palette 231 from the cargo pick-up location to the trailer location. In some implementations, cargo data 132 can include a destination distribution hub and a cargo drop-off location at the destination distribution hub for cargo 250, and when computing system 103 determines that the trailer is at the destination distribution hub, computing system 103 can control ground engaging component(s) 233 to move smart palette 231 from a location of the trailer at the destination distribution hub to the cargo drop-off location.

In some implementations, sensor(s) 124 (FIG. 1) can acquire sensor data indicative of smart palette 231 receiving cargo 250, and computing system 103 can determine receipt of cargo 250 based on the sensor data. In some implementations, sensor(s) 124 can acquire sensor data indicative of an environment within a distribution hub and computing system 103 generate a motion plan from a first location to a second location at the distribution hub based on the sensor data (e.g., from a current location of smart palette 231 to a cargo pick-up location, from a cargo pick-up location to a trailer location, or from a trailer location to a cargo drop-off location). In some implementations, sensor(s) 124 can acquire sensor data indicative of an environment inside a trailer, and computing system 103 generate a motion plan from a first position to a second position inside the trailer based on the sensor data.

FIG. 2B depicts an example of adjusting a platform size of a smart palette according to example embodiments of the present disclosure. As shown in FIG. 2B, computing system 103 can adjust a platform size of smart palette 231. For example, operations computing system 108 can provide data indicative of a cargo pick-up location and cargo dimensions of cargo 260 to computing system 103. Operations computing system 108 can instruct smart palette 231 to pick-up cargo 260, and in response computing system 103 can control smart palette 231 to move to the cargo pick-up location, where smart palette 231 can receive and hold cargo 260 on platform 232. Additionally, if the cargo dimensions of cargo 260 indicate that cargo 260 is larger than a current platform size of platform 232, then computing system 103 can adjust the platform size of platform 232 to accommodate the cargo dimensions by expanding platform 232. For example, computing system 103 can adjust the platform width of platform 232 from a first width $w_1$ to a second width $w_2$.

Figure 3A:
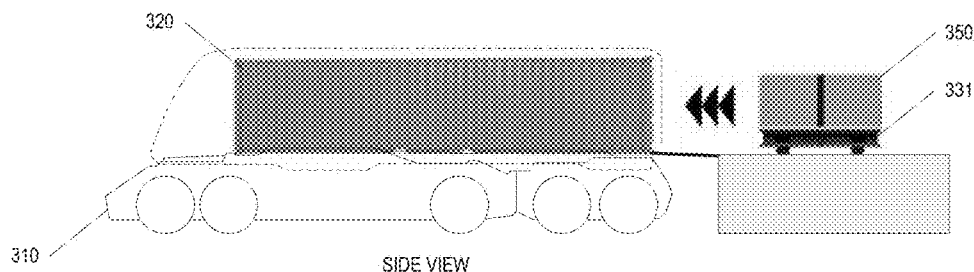
FIG. 3A depicts an example of loading a smart palette onto a trailer according to example embodiments of the present disclosure.

FIG. 3A depicts an example of loading a smart palette onto a trailer according to example embodiments of the present disclosure. As shown in FIG. 3A, a computing system 103 associated with smart palette 331 can control smart palette 331 to load cargo 350 onto trailer 320. For example, trailer 320 and smart palette 331 can be located at a first distribution hub. Operations computing system 108 can assign smart palette to transport cargo 350 from the first distribution hub to a second distribution hub, and can provide cargo data 136 and trailer location data 144 to computing system 103. In response, computing system 103 can control smart palette 331 to move to a pick-up location of cargo 350 to pick-up cargo 350 (e.g., based on cargo data 136), control smart palette 331 to move to the location of trailer 320 (e.g., based on trailer location data 144), and control smart palette 331 to load cargo 350 onto trailer 320 (e.g., by moving smart palette 331 with cargo 350 inside trailer 320). Vehicle 310 can be assigned by operations computing system 108 to transport trailer 320 from the first distribution hub to the second distribution hub. In some implementations, a vehicle computing system 102 associated with vehicle 310 can control vehicle 310 to hitch trailer 320 before smart palette 331 is loaded onto trailer 320. Alternatively, in some implementations, palette computing system 103 can control vehicle 310 to hitch trailer 320 after smart palette 331 is loaded onto trailer 320.

Figure 3B:
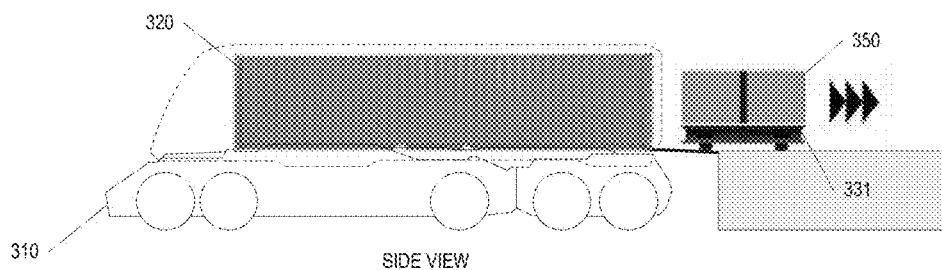
FIG. 3B depicts an example of unloading a smart palette from a trailer according to example embodiments of the present disclosure.

FIG. 3B depicts an example of unloading a smart palette from a trailer according to example embodiments of the present disclosure. As shown in FIG. 3B, computing system 103 can control smart palette 331 to unload cargo 350 from trailer 320. For example, cargo data 136 can include a destination distribution hub of cargo 350, and palette computing system 103 can provide trailer location data 144 to computing system 103 when trailer 320 is in transit. If computing system 103 determines that trailer 320 has arrived at the destination distribution hub of cargo 350 (e.g., based on trailer location data 144), then computing system 103 can control smart palette 331 to unload cargo 350 from trailer 320 (e.g., by moving smart palette 331 with cargo 350 off trailer 320). In some implementations, vehicle computing system 102 can control vehicle 310 to unhitch trailer 320 before smart palette 331 is unloaded from trailer 320. Alternatively, in some implementations, palette computing system 103 can control vehicle 310 to unhitch trailer 320 after smart palette 331 is unloaded from trailer 320. Alternatively, in some implementations, palette computing system 103 can control vehicle 310 to remain hitched trailer 320 before and after smart palette 331 is unloaded from trailer 320 (e.g., to transport trailer 320 to another location).

Figure 3C:
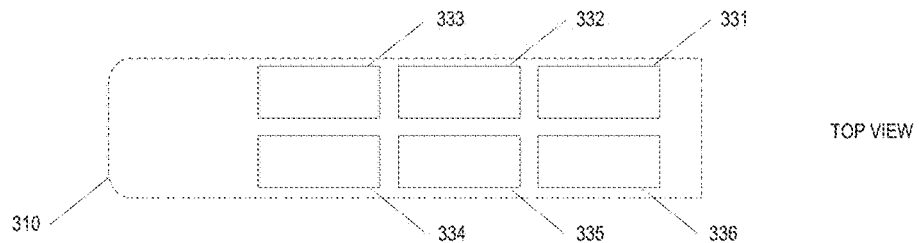
FIG. 3C-E depict examples of smart palettes positioned inside a trailer according to example embodiments of the present disclosure.

FIG. 3C depicts an example of smart palettes positioned inside a trailer according to example embodiments of the present disclosure. As shown in FIG. 3C, smart palettes 331, 332, 333, 334, 335, and 336 can be positioned inside trailer 320. Operations computing system 108 can provide palette data 137 to computing system 103 indicative of a palette computing system associated with each smart palette 332-336, and computing system 103 can communicate with the palette computing system associated with each smart palette 332-336 (e.g., based on palette data 137) to position smart palette 331 inside trailer 320. Computing system 103 can obtain data indicative of a position of each smart palette 332-336 from the palette computing system associated with each smart palette 332-336, to determine unused space inside trailer 320. Computing system 103 can position smart palette 331 at the unused space (or a portion thereof) inside trailer 320.

In some implementations, palette computing system 103 can provide transportation route data 140 to computing system 103 indicative of a transportation route of vehicle 310, and computing system 103 can communicate with the palette computing system associated with each smart palette 332-336 to position smart palette 331 inside trailer 320 based on the transportation route data 140. Computing system 103 can obtain palette data 137 indicative of a destination distribution hub corresponding to cargo associated with each smart palette 332-336 (e.g., from operations computing system 108 and/or palette computing systems associated with each smart palette 332-336) so that palettes with cargo that will unload sooner are positioned nearer to an exit of the trailer 320. For example, if a destination distribution hub associated with smart palette 331 is distribution hub "A" (e.g., hub A), a destination distribution hub associated with smart palette 332 is distribution hub "B" (e.g., hub B), and the transportation route of vehicle 310 indicates that trailer 320 will arrive at hub A before hub B, then computing system 103 can position smart palette 331 nearer to an exit of trailer 320. Alternatively, if the transportation route of vehicle 310 indicates that trailer 320 will arrive at hub B before hub A, then computing system 103 can position smart palette 331 farther from an exit of trailer 320 so that the palette computing system associated with smart palette 332 can position smart palette 332 nearer to the exit.

In some implementations, palette computing system 103 can provide load distribution data 142 to computing system 103 indicative of a load distribution of smart palettes 331-336 inside trailer 320, and computing system 103 can communicate with the palette computing system associated with each smart palette 332-336 to position smart palette 331 inside trailer 320 based on the load distribution data 142. Palette computing system 103 can obtain data indicative of the load distribution from sensor(s) 125 associated with trailer 320 to provide the data to computing system 103. Computing system 103 can communicate with the palette computing system associated with each smart palette 332-336 to determine an optimal position for smart palette 331 inside trailer 320. For example, computing system 103 can determine a position for smart palette 331 such that the weight associated with each smart palette 331-336 is distributed evenly inside trailer 320. In some implementations, load distribution data 142 can include an optimal load distribution. For example, if a tire of vehicle 310 associated with a front end of trailer 320 is damaged or deflated, then palette computing system 103 can provide load distribution data 142 that includes an optimal load distribution toward a rear end of trailer 320. In response to receiving data indicative of the optimal load distribution, computing system 103 can communicate with the palette computing system associated with each smart palette 332-336 to determine a position for smart palette 331 such that weight associated with each smart palette 331-336 is distributed toward the rear end of trailer 320.

Figure 3D:
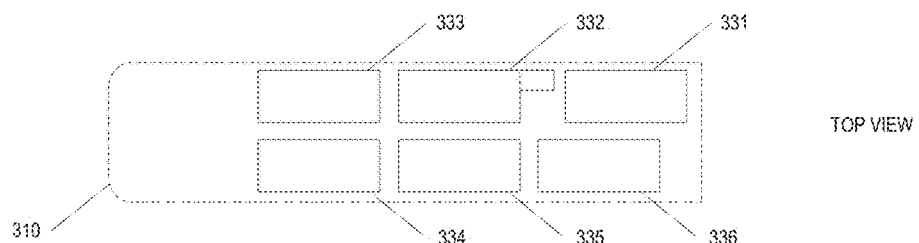
Figure 3E:
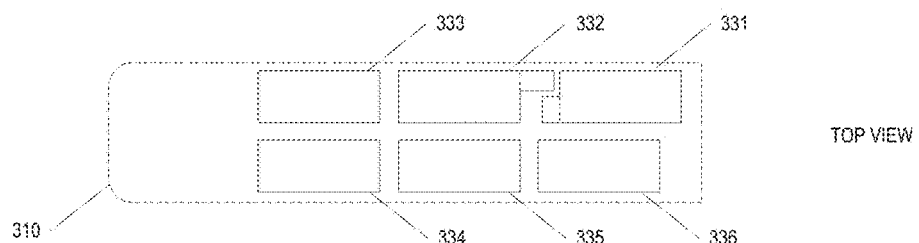

In some implementations, palette data 137 can include data indicative of a palette size associated with each smart palette 331-336 and/or one or more dimensions corresponding to cargo associated with each smart palette 331-336. Alternatively, computing system 103 can obtain palette data 137 from the palette computing system associated with each smart palette 332-336 indicative of the palette size associated with each smart palette 331-336 and/or the one or more dimensions corresponding to cargo associated with each smart palette 332-336. Computing system 103 can use the palette data 137 to more accurately determine an unused space inside trailer 320, and communicate with the palette computing system associated with each smart palette 332-336 to position smart palette 331 inside trailer 320 to minimize the unused space inside the trailer. For example, as shown in FIG. 3D, a portion of cargo associated with smart palette 332 extends beyond the palette size of smart palette 332. Computing system 103 can determine that unused space inside trailer 320 does not include the region occupied by the extended portion, and can position smart palette 331 based on the determined unused space such that palette 331 does not occupy the region associated with the extended portion. In particular, as shown in FIG. 3E, if computing system 103 determines that a portion of cargo associated with smart palette 331 extends beyond the palette size of smart palette 331, then computing system 103 can position smart palette 331 to minimize the unused space inside the trailer.

Figure 4A:
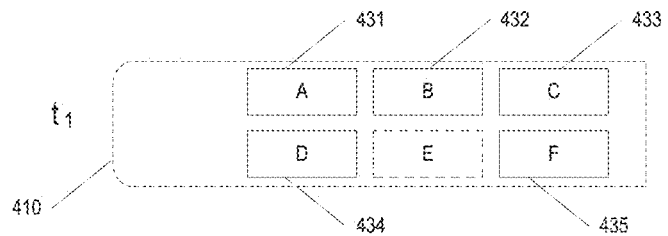
FIGS. 4A-4I depict an example of repositioning a smart palette inside a trailer according to example embodiments of the present disclosure.

FIGS. 4A-4I depict an example of repositioning a smart palette inside a trailer according to example embodiments of the present disclosure. As shown in FIG. 4A, vehicle 410 can be assigned to transport a trailer that includes smart palettes 431, 432, 433, 434, and 435. Smart palette 431 can be positioned inside the trailer at position A, smart palette 432 at position B, smart palette 433 at position C, smart palette 434 at position D, smart palette 435 at position F, such that position E inside the trailer is unused space.

Figure 4B:
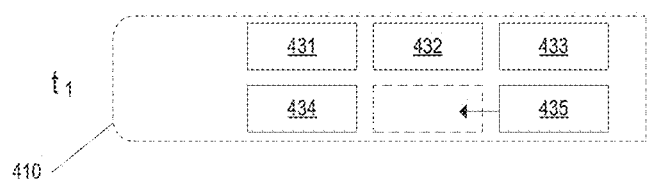
Figure 4C:
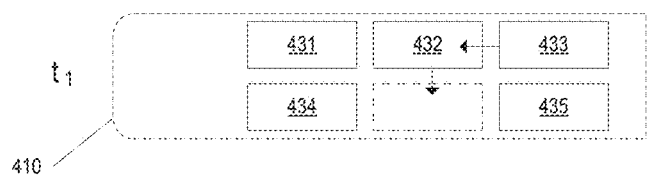
Figure 4D:
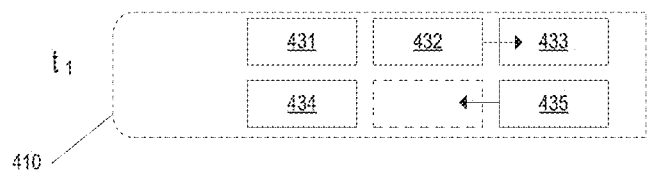
Figure 4D:
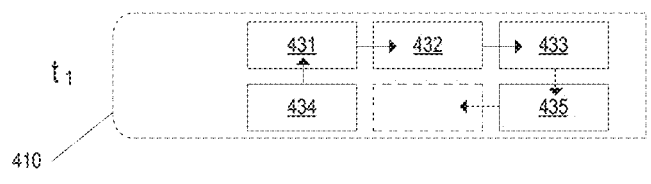
Figure 4E:
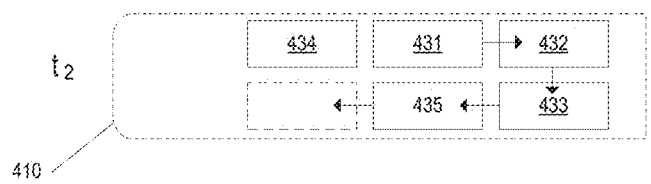
Figure 4E:
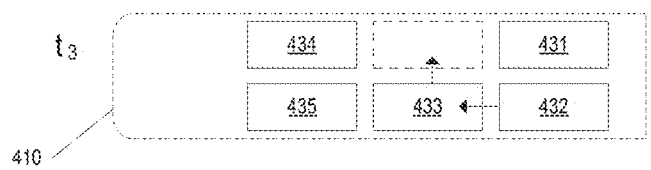

As a first example based on the palette positions shown in FIG. 4A, if a palette computing system 103 associated with vehicle 410 determines a tire failure of a tire associated with a rear end of the trailer (e.g., during transit), then palette computing system 103 can provide load distribution data 142 to palette computing systems 103 associated with smart palettes 431-435 (e.g., to a palette computing system 103 associated with each of smart palettes 431-435) indicative of an optimal load distribution toward a front end of the trailer. As shown in FIG. 4B at time $t_1$, in response to receiving the data indicative of the optimal load distribution, computing system 103 associated with smart palette 435 can reposition smart palette 435 from position F to position E inside the trailer to shift the load distribution toward the front end of the trailer. Alternatively, if palette data 137 includes data indicative of a cargo weight and computing systems 103 determine that a cargo weight associated with smart palette 433 is more than a cargo weight associated with smart palette 435, then as shown in FIG. 4C at time $t_1$, computing system 103 associated with smart palette 432 can reposition smart palette 432 from position B to position E, and computing system 103 associated with smart palette 433 can reposition smart palette 433 from position C to position B, to shift the load distribution toward the front end of the trailer. Alternatively, as shown in FIG. 4D at time $t_1$, if computing systems 103 determine that a cargo weight associated with smart palette 432 is less than a cargo weight associated with smart palette 433 and 435, then computing system 103 associated with smart palette 435 can reposition smart palette 435 from position F to position E, computing system 103 associated with smart palette 433 can reposition smart palette 433 from position C to position F, and computing system 103 associated with smart palette 432 can reposition smart palette 432 from position B to position C, to shift the load distribution toward the front end of the trailer. Alternatively, as shown in FIG. 4E, if computing systems 103 determine that a cargo weight associated with smart palette 431 is less than a cargo weight associated with smart palettes 432-435, then: at time $t_1$ smart palette 435 can be repositioned from position F to E, smart palette 433 can be repositioned from position C to F, smart palette 432 can be repositioned from position B to C, and smart palette 431 can be repositioned from position A to B; at time $t_2$ smart palette 435 can be repositioned from position E to D, smart palette 433 can be repositioned from position F to E, smart palette 432 can be repositioned from position C to F, and smart palette 431 can be repositioned from position B to C; and at time t₃ smart palette 433 can be repositioned from position E to B, and smart palette 432 can be repositioned from position F to E. In this way, computing systems 103 associated with smart palettes 431-435 can reposition smart palettes 431-435 based on a cargo weight associated with each of smart palettes 431-435 such that more weight is distributed toward a front end of trailer 320.

Figure 4F:
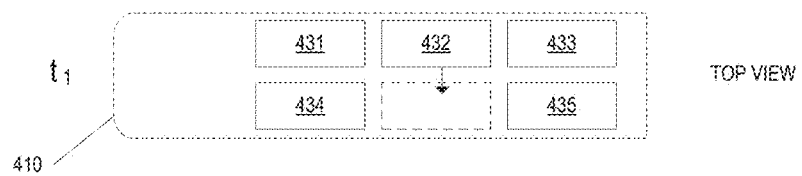

As a second example based on the palette positions shown in FIG. 4A, if a palette computing system 103 associated with vehicle 410 determines a tire failure (e.g., during transit) of a tire associated with a right side of the trailer, then palette computing system 103 can provide load distribution data 142 to palette computing systems 103 associated with smart palettes 431-435 (e.g., to a palette computing system 103 associated with each of smart palettes 431-435) indicative of an optimal load distribution toward a left side of the trailer. As shown in FIG. 4F at time t₁, computing system 103 associated with smart palette 432 can reposition smart palette 432 from position B to position D inside the trailer to shift the load distribution toward the left side of the trailer.

Figure 4G:
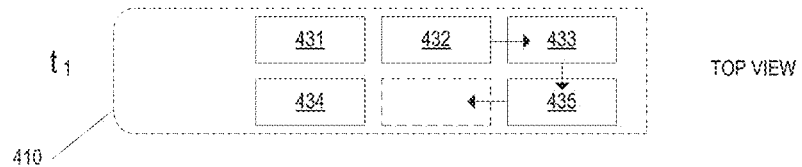
Figure 4H:
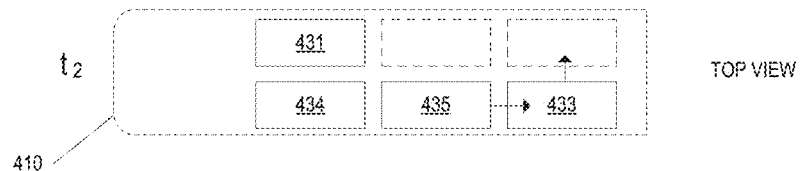
Figure 4I:
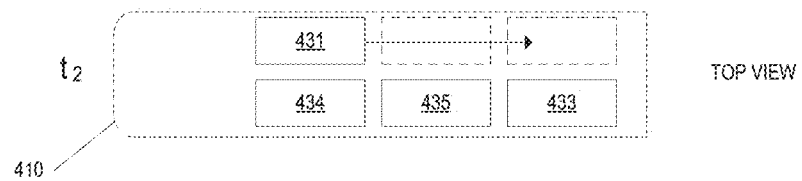

As a third example based on the palette positions shown in FIG. 4A, a destination distribution hub associated with cargo corresponding to smart palettes 433 and 435 can be distribution hub "X" (e.g., hub X), a destination distribution hub associated with cargo corresponding to smart palette 432 can be distribution hub "Y" (e.g., hub Y), and a transportation route associated with vehicle 410 can indicate that the trailer will arrive at hub X before hub Y. Accordingly, as shown in FIG. 4A, smart palettes 433 and 435 can be positioned nearer to an exit of the trailer (e.g., towards a rear end of the trailer) so that smart palettes 433 and 435 can be immediately unload from the trailer when the trailer arrives at hub X. If a palette computing system 103 associated with vehicle 410 adjusts the transportation route (e.g., during transit) such that the trailer will arrive at hub Y before hub X, then the palette computing system 103 can provide transportation route data 142 to palette computing systems 103 associated with smart palettes 431-435 (e.g., to a palette computing system 103 associated with each of smart palettes 431-435) indicative of the change in the transportation route (e.g., the adjusted transportation route). As shown in FIG. 4G at time t₁, in response to receiving the data indicative of the change in the transportation route, computing system 103 associated with smart palette 435 can reposition smart palette 435 from position F to position E, computing system 103 associated with smart palette 433 can reposition smart palette 433 from position C to position F, and computing system 103 associated with smart palette 432 can reposition smart palette 432 from position B to position C, such that smart palette 432 is nearer to the exit of the trailer so that smart palette 432 can be immediately unloaded from the trailer when the trailer arrives at hub Y. As shown in FIG. 4H, if transportation route data 140 indicates that the trailer is being transported to hub X when the trailer departs hub Y, then at time t₂ (after computing system 103 associated with smart palette 432 unloads smart palette 432 at hub Y) computing system 103 associated with smart palette 433 can reposition smart palette 433 from position F to position C, and computing system 103 associated with smart palette 435 can reposition smart palette 435 from position E to position F, such that smart palettes 433 and 435 are nearer to the exit of the trailer so that smart palettes 433 and 435 can be immediately unloaded from the trailer when the trailer arrives at hub X. Alternatively, as shown in FIG. 4I, if the transportation route data 140 indicates that the trailer is being transported to distribution hub "Z" (e.g., hub Z) when the trailer departs hub Y, and palette data 137 indicates that a destination distribution hub associated with cargo corresponding to smart palette 431 is hub Z, then at t₂ (after computing system 103 associated with smart palette 432 unloads smart palette 432 at hub Y) computing system 103 associated with smart palette 431 can reposition smart palette 431 from position A to position C, such that smart palette 431 is nearer to the exit of the trailer so that smart palette 431 can be immediately unloaded from the trailer when the trailer arrives at hub Z. In this way, computing systems 103 associated with smart palettes 431-435 can reposition smart palettes 431-435 based on a change in the transportation route associated vehicle 410 so that smart palettes with cargo that will unload sooner are positioned nearer to the exit of the trailer.

Figure 5:
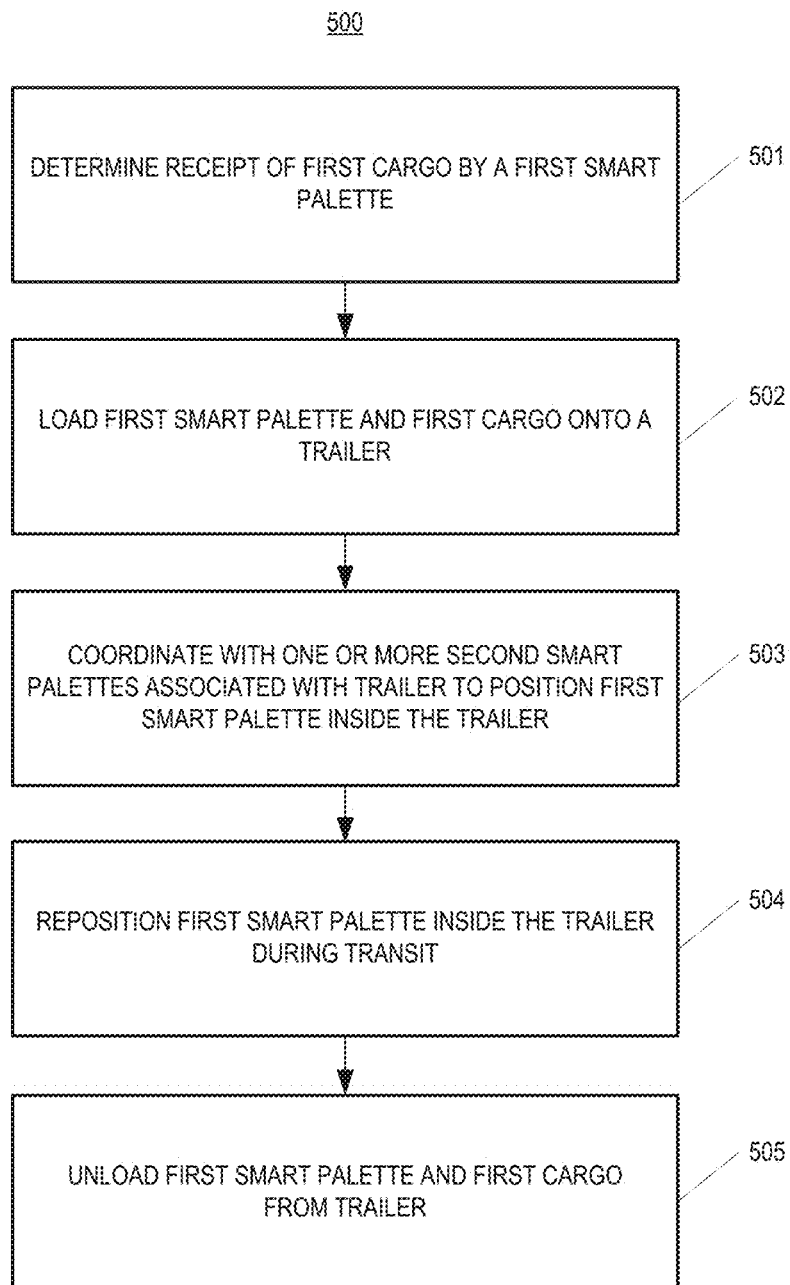
FIG. 5 depicts a flow diagram of an example method 500 for providing a vehicle-based service according to example embodiments of the present disclosure.

FIG. 5 depicts a flow diagram of an example method 500 for providing a vehicle-based service according to example embodiments of the present disclosure. One or more portion(s) of the method 500 can be implemented as operations by one or more computing system(s) such as computing system(s) 102, 103, 108, and 610 shown in FIGS. 1 and 6. For example, FIG. 5 illustrates certain operations being performed by specific computing systems described herein. However, it should be appreciated that such operations may generally be performed by any suitable computing system or combination of computing systems consistent with the disclosure provided herein. Moreover, one or more portion(s) of the method 500 can be implemented as an algorithm on the hardware components of the system(s) described herein (e.g., as in FIGS. 1 and 6), for example, transport cargo from one location to another location. FIG. 5 depicts elements performed in a particular order for purposes of illustration and discussion. Those of ordinary skill in the art, using the disclosures provided herein, will understand that the elements of method 500 discussed herein can be adapted, rearranged, expanded, omitted, combined, and/or modified in various ways without deviating from the scope of the present disclosure.

FIG. 5 depicts a flow diagram of method 500 for transporting cargo using a smart palette according to example embodiments of the present disclosure.

At (501), the method 500 includes determining receipt of a first cargo by a first smart palette. For example, a palette computing system 103 associated with a smart palette 30 can determine receipt of a first cargo onto a platform of a first smart palette 30 at a first distribution hub.

At (502), the method 500 includes loading the first smart palette and first cargo onto a trailer. For example, computing system 103 can generate one or more signals that control a loading of the first smart palette 30 and the first cargo onto a trailer 20 located at the first distribution hub.

At (503), the method 500 includes coordinating with one or more second smart palettes associated with the trailer to position the first smart palette inside the trailer. For example, computing system 103 can determine a coordination with one or more second smart palettes 30 associated with the trailer 20 to determine a first position inside the trailer 20 for the first smart palette 30 and the first cargo. Computing system 103 can generate one or more signals that position the first smart palette 30 and the first cargo at the first position inside the trailer 20. Computing system 103 can obtain palette data 137 indicative of the one or more second smart palettes 30 that are associated with the trailer 20, and communicate with the one or more second smart palettes 30 that are associated with the trailer 20 to determine the first position for the first smart palette 30.

In some implementations, computing system 103 can determine the first position based at least in part on at least one of transportation route data 140 including a transportation route of autonomous vehicle 10 that is transporting the trailer 20, load distribution data 142 including a load distribution of the first smart palette 30 and the one or more second smart palettes 30 inside the trailer 20, or palette data 127 including one or more dimensions associated with the first cargo.

In some implementations, computing system 103 can obtain transportation route data 140 indicative of a transportation route associated with the trailer 20 (e.g., transportation route associated with the autonomous vehicle 10 transporting the trailer 20), palette data 137 indicative of one or more destination distribution hubs associated with the first smart palette 30 and the one or more second smart palettes 30, load distribution data 142 indicative of a load distribution of the first smart palette 30 and the one or more second smart palettes 30 inside the trailer 20, and palette data 137 indicative of one or more dimensions of cargo associated with the first smart palette 30 and the one or more second smart palettes 30. Computing system 103 can determine the first position for the first smart palette based at least in part on the transportation route, the one or more destination distribution hubs, the load distribution, and the one or more dimensions of cargo. Computing system 103 can provide data indicative of the first position to at least one of the one or more second smart palettes 30 or a computing system associated with the trailer 20 (e.g., palette computing system 103 of the autonomous vehicle 10 hitched to the trailer 20).

In some implementations, computing system 103 can provide at least one of data indicative of one or more destination distribution hubs associated with the first cargo, or one or more dimensions of the first cargo, to a remote computing system associated with the one or more second smart palettes 30 (e.g., to a palette computing system 103 onboard the one or more second smart palettes 30 or an operations computing system 108 that is remote from the first smart palette 30 and the one or more second smart palettes 30). Computing system 103 can receive data indicative of the first position for the first smart palette from the remote computing system associated with the one or more second smart palettes 30 in response to providing at least one of the data indicative of the one or more destination distribution hubs associated with the first cargo or the one or more dimensions of the first cargo.

In some implementations, computing system 103 can generate one or more signals that move the first smart palette 30 and the first cargo to the first position inside the trailer 20, and determine a coordination with at least one of the one or more second smart palettes 30 to move the at least one second smart palette 30 from an initial position associated with the second smart palette 30 inside the trailer 20 to a different position inside the trailer 20.

In some implementations, the one or more second smart palettes 30 can include at least one second smart palette 30 that is previously positioned inside the trailer 20 when loading the first smart palette 30 onto the trailer 20.

In some implementations, the one or more second smart palettes 30 can include at least one second smart palette 30 associated with the first distribution hub and loaded onto the trailer 20 at the first distribution hub after the first smart palette 30 is positioned inside the trailer 20.

At (504), the method 500 includes repositioning the first smart palette inside the trailer during transit. For example, computing system 103 can obtain data indicative of at least one second smart palette 30 from the one or more second smart palettes 30 being onto the trailer 20, being positioned inside the trailer 20, or being repositioned inside the trailer 20. Computing system 103 can determine a coordination with the at least one second smart palette 30 to determine a second position inside the trailer 20 for the first smart palette 30 and first cargo. Computing system 103 can generate one or more signals that move the first smart palette 30 and the first cargo from the first position to the second position.

In some implementations, computing system 103 can generate one or more signals that move the first smart palette 30 from the first position inside the trailer 20 to a second position inside the trailer 20 while the trailer 20 is in transit from a location at the first distribution hub to another location.

In some implementations, computing system 103 can obtain load distribution data 142 indicative of a change in load distribution of the first smart palette 30 and the one or more second smart palettes 30 inside the trailer 20, and determine a coordination with the one or more second smart palettes 30 to determine the second position based at least in part on the change in the load distribution. The load distribution data 142 can be based at least in part on sensor data from one or more sensors 124 associated with at least one of the first smart palette 30, the one or more second smart palettes 30, or the trailer 20.

In some implementations, computing system 103 can obtain transportation route data 140 indicative of a change in destination associated with the trailer 20 from an autonomous vehicle 10 that is transporting the trailer 20 from the location at the first distribution hub to the other location, and determine a coordination with the one or more second smart palettes 30 to determine the second position based at least in part on the change in destination.

At (505), the method 500 includes unloading the first smart palette and first cargo from the trailer. For example, computing system 103 can determine that the trailer 20 is at a second distribution hub that is a destination distribution hub of the first cargo, and generate one or more signals that move the first smart palette 30 and the first cargo from the trailer 20 to a second location within the second distribution hub when the second distribution hub is the destination distribution hub.

Figure 6:
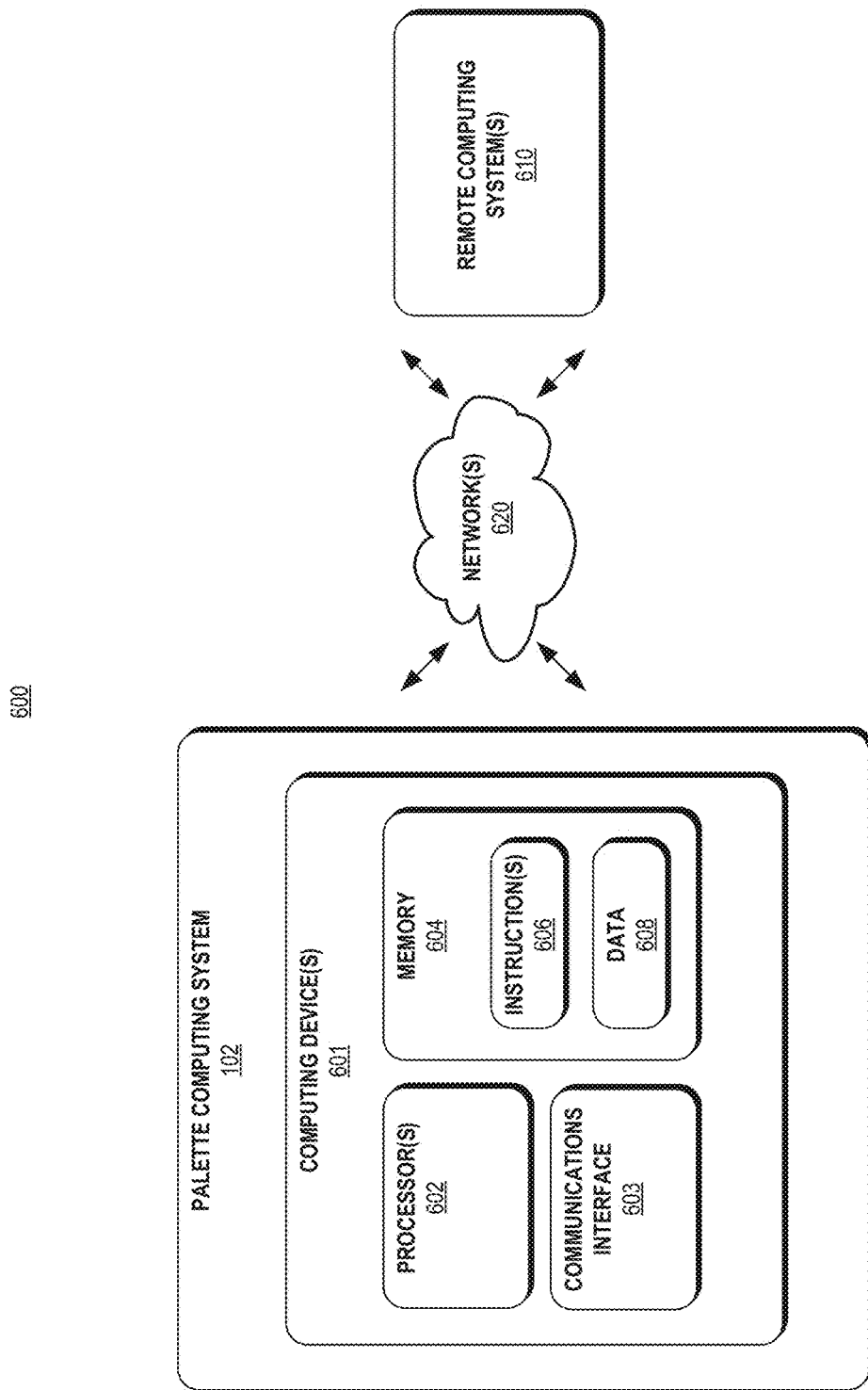
FIG. 6 depicts example system components according to example embodiments of the present disclosure.

FIG. 6 depicts an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include palette computing system 103 of smart palette(s) 30 and, in some implementations, remote computing system(s) 610 including one or more remote computing system(s) that are remote from smart palette(s) 30 (e.g., palette computing system 103, operations computing system 108) that can be communicatively coupled to one another over one or more networks 620. The remote computing system 610 can be associated with a central operations system and/or an entity associated with the smart palette(s) 30 such as, for example, a fleet operator, service provider, etc.

The computing device(s) 601 of the palette computing system 103 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the smart palette(s) 30 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the smart palette(s) 30 can store instructions 606 that when executed by the one or more processors 602 on-board the smart palette(s) 30 cause the one or more processors 602 (the palette computing system 103) to perform operations such as any of the operations and functions of the palette computing system 103, as described herein, one or more operations of method 500, and/or any other operations and functions of the palette computing system 103, as described herein.

The memory 604 can store data 608 that can be obtained, received, accessed, written, manipulated, created, and/or stored. The data 608 can include, for instance, data associated with perception, prediction, motion plan, maps, cargo, palettes, transportation route, load distribution, trailer location, and/or other data/information as described herein. In some implementations, the computing device(s) 601 can obtain data from one or more memory device(s) that are remote from the smart palette(s) 30.

The computing device(s) 601 can also include a communication interface 603 used to communicate with one or more other system(s) on-board the smart palette(s) 30 and/or a remote computing device that is remote from the smart palette(s) 30 (e.g., of remote computing system(s) 610). The communication interface 603 can include any circuits, components, software, etc. for communicating via one or more networks (e.g., 620). In some implementations, the communication interface 603 can include, for example, one or more of a communications controller, receiver, transceiver, transmitter, port, conductors, software, and/or hardware for communicating data.

The network(s) 620 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the palette computing system 103. The remote computing devices can include components (e.g., processor(s), memory, instructions, data) similar to that described herein for the computing device(s) 601. Moreover, the remote computing system(s) 610 can be configured to perform one or more operations of the palette computing system 103, as described herein. Moreover, the computing systems of other smart palette(s) 30 described herein can include components similar to that of palette computing system 103.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
   obtaining data indicative of a plurality of smart pallets located at a first location;
   based on the data indicative of the plurality of smart pallets, determining a first smart pallet to autonomously load cargo onto a trailer of an autonomous vehicle at the first location;
   providing, to the first smart pallet, data instructing the first smart pallet to move the cargo to an inside of the trailer of the autonomous vehicle;
   providing, to the autonomous vehicle, data indicative of a second location, wherein the autonomous vehicle is to transport the cargo with the first smart pallet from the first location to the second location;
   determining, based on data indicative of a location of the trailer of the autonomous vehicle, that the autonomous vehicle has arrived at the second location; and
   providing data instructing the first smart pallet to unload the cargo from the inside of the trailer of the autonomous vehicle at the second location.

2. The computer-implemented method of claim 1, wherein the data instructing the first smart pallet to move the cargo to the inside of the trailer comprises a pick-up location for retrieving the cargo.

3. The computer-implemented method of claim 1, wherein the data instructing the first smart pallet to move the cargo to the inside of the trailer comprises a trailer location of the trailer of the autonomous vehicle.

4. The computer-implemented method of claim 1, wherein the data instructing the first smart pallet to move the cargo to the inside of the trailer is indicative of the autonomous vehicle.

5. The computer-implemented method of claim 1, wherein the data instructing the first smart pallet to move the cargo to the inside of the trailer comprises a cargo route for the cargo.

6. The computer-implemented method of claim 1, wherein the data instructing the first smart pallet to unload the cargo from the inside of the trailer of the autonomous vehicle at the second location comprises data indicative of a trailer of another vehicle in which the first smart pallet is to load the cargo.

7. The computer-implemented method of claim 1, further comprising:
   determining a change in a transportation route of the autonomous vehicle; and
   based on the change in the transportation route, providing data instructing the smart pallet to move within the inside of the trailer.

8. The computer-implemented method of claim 7, wherein the change in the transportation route comprises the autonomous vehicle stopping at a third location.

9. The computer-implemented method of claim 8, wherein the smart pallet is configured to move within the inside of the trailer prior to the autonomous vehicle arriving at the third location.

10. The computer-implemented method of claim 1, comprising:
    determining a position for the first smart pallet within the trailer of the autonomous vehicle,
    wherein the position of the first smart pallet is determined relative to an exit of the trailer based on a timing of the cargo being unloaded at the second location.

11. The computer-implemented method of claim 1, wherein the trailer comprises one or more second smart palettes that are communicatively connected to the first smart pallet.

12. A computing system comprising:
    one or more processors; and
    one or more tangible, non-transitory, computer readable media that store instructions that are executable by the one or more processors to cause the computing system to perform operations, the operations comprising:
       obtaining data indicative of a plurality of smart pallets located at a first location;
       based on the data indicative of the plurality of smart pallets, determining a first smart pallet to autonomously load cargo onto a trailer of an autonomous vehicle at the first location;
       providing, to the first smart pallet, data instructing the first smart pallet to move the cargo to an inside of the trailer of the autonomous vehicle;
       providing, to the autonomous vehicle, data indicative of a second location, wherein the autonomous vehicle is to transport the cargo with the first smart pallet from the first location to the second location;
       determining, based on data indicative of a location of the trailer of the autonomous vehicle, that the autonomous vehicle has arrived at the second location; and
       providing data instructing the first smart pallet to unload the cargo from the inside of the trailer of the autonomous vehicle at the second location.

13. The computing system of claim 12, wherein the data instructing the first smart pallet to move the cargo to the inside of the trailer comprises a pick-up location for retrieving the cargo.

14. The computing system of claim 12, wherein the data instructing the first smart pallet to move the cargo to the inside of the trailer comprises a trailer location of the trailer of the autonomous vehicle.

15. The computing system of claim 12, wherein the data instructing the first smart pallet to move the cargo to the inside of the trailer is indicative of the autonomous vehicle.

16. The computing system of claim 12, wherein the data instructing the first smart pallet to move the cargo to the inside of the trailer comprises a cargo route for the cargo.

17. The computing system of claim 12, wherein the data instructing the first smart pallet to unload the cargo from the inside of the trailer of the autonomous vehicle at the second location comprises data indicative of a trailer of another vehicle in which the first smart pallet is to load the cargo.

18. The computing system of claim 12, wherein the operations further comprise:
    determining a position for the first smart pallet within the trailer of the autonomous vehicle,
    wherein the position of the first smart pallet is determined relative to an exit of the trailer based on a timing of the cargo being unloaded at the second location.

19. The computing system of claim 12, wherein the trailer comprises one or more second smart palettes that are communicatively connected to the first smart pallet.

20. One or more tangible, non-transitory, computer readable media that store instructions that are executable by the one or more processors to perform operations comprising:
    obtaining data indicative of a plurality of smart pallets located at a first location;
    based on the data indicative of the plurality of smart pallets, determining a first smart pallet to autonomously load cargo onto a trailer of an autonomous vehicle at the first location;
    providing, to the first smart pallet, data instructing the first smart pallet to move the cargo to an inside of the trailer of the autonomous vehicle;
    providing, to the autonomous vehicle, data indicative of a second location, wherein the autonomous vehicle is to transport the cargo with the first smart pallet from the first location to the second location;
    determining, based on data indicative of a location of the trailer of the autonomous vehicle, that the autonomous vehicle has arrived at the second location; and
    providing data instructing the first smart pallet to unload the cargo from the inside of the trailer of the autonomous vehicle at the second location.

* * * * *